United States Patent
Suh et al.

(10) Patent No.: US 12,372,931 B2
(45) Date of Patent: Jul. 29, 2025

(54) SOLAR ENERGY MANAGEMENT METHOD AND SYSTEM USING DEEP REINFORCEMENT LEARNING

(71) Applicant: Kyungpook National University Industry-Academic Cooperation Foundation, Daegu (KR)

(72) Inventors: Dongjun Suh, Gimcheon-si (KR); Geonkyo Hong, Daejeon (KR); Minjeong Sim, Seoul (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 488 days.

(21) Appl. No.: 17/900,868

(22) Filed: Sep. 1, 2022

(65) Prior Publication Data
US 2023/0350366 A1 Nov. 2, 2023

(30) Foreign Application Priority Data
Apr. 29, 2022 (KR) .......... 10-2022-0053254

(51) Int. Cl.
*G05B 19/042* (2006.01)
*G06N 3/08* (2023.01)

(52) U.S. Cl.
CPC .......... *G05B 19/042* (2013.01); *G06N 3/08* (2013.01); *G05B 2219/2639* (2013.01)

(58) Field of Classification Search
CPC .......... G05B 19/042; G05B 2219/2639; G06N 3/08; G06N 3/092
See application file for complete search history.

(56) References Cited

U.S. PATENT DOCUMENTS

| 11,431,170 B1 * | 8/2022 | Guo ............... H02J 3/004 |
| 2014/0279361 A1 * | 9/2014 | Streeter ............ G06Q 40/04 705/37 |
| 2021/0367426 A1 * | 11/2021 | Yang ............... G06Q 50/06 |

FOREIGN PATENT DOCUMENTS

| CN | 114331025 | * | 11/2021 |
| KR | 10-2015-0053704 A | | 5/2015 |
| KR | 10-1899123 B1 | | 10/2018 |
| KR | 10-2159692 B1 | | 9/2020 |
| KR | 10-2021-0133066 A | | 11/2021 |
| KR | 10-2021-0147366 A | | 12/2021 |
| KR | 10-2022-0008565 A | | 1/2022 |
| KR | 10-2350667 B1 | | 1/2022 |

* cited by examiner

*Primary Examiner* — Tameem D Siddiquee
(74) *Attorney, Agent, or Firm* — Park, Kim & Suh, LLC

(57) ABSTRACT

Disclosed is a solar energy management method using deep reinforcement learning including receiving, by at least one processor, at least one or more pieces of energy information data for deep reinforcement learning of a deep neural network, calculating, by the at least one processor, a reward value for controlling a solar energy management algorithm constituting the deep neural network using the at least one or more pieces of energy information data and performing the deep reinforcement learning, and determining, by the at least one processor, a schedule for storing, discharging, consuming or selling solar energy by inputting the at least one or more pieces of energy information data as input data of the solar energy management algorithm.

12 Claims, 11 Drawing Sheets

Deep neural network for deep reinforcement learning

FIG. 5E

| Model | Monetary benefit |
|---|---|
| Deep reinforcement learning model proposed considering sales and consumption | $21,209 |
| Deep reinforcement learning model considering sales alone | $17,919 |
| Deep reinforcement learning model considering consumption alone | $9,078 |
| Rule-based learning approach | $3,725 |

SOLAR ENERGY MANAGEMENT METHOD AND SYSTEM USING DEEP REINFORCEMENT LEARNING

CROSS-REFERENCE TO RELATED APPLICATIONS

This application claims priority under 35 U.S.C. § 119 to Korean Patent Application No. 10-2022-0053254 filed on Apr. 29, 2022, in the Korean Intellectual Property Office, the disclosures of which are incorporated by reference herein in their entireties.

BACKGROUND

Embodiments of the present disclosure described herein relate to a solar energy management method and system using deep reinforcement learning. The present disclosure is derived from a study conducted as part of the power industry basic research project of the Ministry of Trade, Industry and Energy: [Project No.: R21XO01-36, Research management institution: Research management institution: Korea Electric Power Corporation Electric Power Research Institute, Project title: CEMS-based future smart energy life model development, research period: 2021 Feb. 1~2024 Jan. 31, contribution rate: 1/1]. On the other hand, there is no property interest of the Korean government in any aspect of the present disclosure.

Recently, in order to reduce the amount of carbon dioxide emitted due to the reckless use of fossil fuels, the proportion of use of eco-friendly energy (or renewable energy) such as solar energy is increasing.

In general, solar energy is generated by using a solar panel during the daytime when the intensity of sunlight is strong. On the other hand, the main power consumption time in residential buildings or the like is in the evening and does not coincide with the time period of solar power generation.

On the other hand, solar energy generated by photovoltaic power generation is sold to power companies (or power grids) in addition to being consumed in residential buildings, but there is no optimal energy consumption and energy trade due to the lack of efficient energy management strategies.

Accordingly, there is a need for an efficient energy management strategy considering optimal sales as well as solar energy consumption in residential buildings using artificial intelligence learning.

SUMMARY

Embodiments of the present disclosure provide solar energy management method and system for performing scheduling such that solar energy is in any one state of being stored, discharged, consumed, or sold using a deep neural network using deep reinforcement learning.

According to an embodiment, a solar energy management method using deep reinforcement includes receiving, by at least one processor, at least one or more pieces of energy information data for deep reinforcement learning of a deep neural network, calculating, by the at least one processor, a reward value for controlling a solar energy management algorithm constituting the deep neural network using the at least one or more pieces of energy information data and performing the deep reinforcement learning, and determining, by the at least one processor, a schedule for storing, discharging, consuming or selling solar energy by inputting the at least one or more pieces of energy information data as input data of the solar energy management algorithm.

According to an embodiment, the receiving, by the at least one processor, the at least one or more pieces of energy information data may include receiving, by the at least one processor, an amount of generated solar energy from a photovoltaic system, receiving, by the at least one processor, a load power amount measured in a target building, receiving, by the at least one processor, an amount of stored solar energy of a charging device; receiving, by the at least one processor, a selling price of the solar energy to a power grid, receiving, by the at least one processor, an average selling price that is an average value of selling prices, receiving, by the at least one processor, a consumption price of power consumed in the target building according to the load power amount, and receiving, by the at least one processor, a maximum load power amount measured in the target building.

According to an embodiment of the present disclosure, the determining, by the at least one processor, the schedule for storing, discharging, consuming or selling solar energy may include inputting, by the at least one processor, the amount of generated solar energy, the load power amount, the amount of stored solar energy, the selling price of the solar energy, the average selling price, the consumption price, and the maximum load power amount to the solar energy management algorithm as the input data.

According to an embodiment, the determining, by the at least one processor, the schedule for storing, discharging, consuming or selling solar energy may include determining, by the at least one processor, a largest output value of a Q-Value for an input value and an action value from among output values of the solar energy management algorithm as a target output value.

According to an embodiment, the determining, by the at least one processor, the schedule for storing, discharging, consuming or selling solar energy may include, when an action value of the target output value is negative, the load power amount is greater than or equal to half of the maximum load power amount, and the average selling price is less than the consumption price, and determining, by the at least one processor, a schedule for discharging the solar energy stored in the charging device and allowing the target building to consume the solar energy.

According to an embodiment, the determining, by the at least one processor, the schedule for storing, discharging, consuming or selling solar energy may include, when an action value of the target output value is negative, the load power amount is greater than or equal to half of the maximum load power amount, and the average selling price is greater than or equal to the consumption price, and determining, by the at least one processor, a schedule for discharging the solar energy stored in the charging device and selling the solar energy to the power grid.

According to an embodiment, the determining, by the at least one processor, the schedule for storing, discharging, consuming or selling solar energy may include, when an action value of the target output value is positive and the amount of generated solar energy is greater than or equal to the load power amount, and determining, by the at least one processor, a schedule for storing the solar energy in the charging device.

According to an embodiment, the calculating, by the at least one processor, the reward value for controlling the solar energy management algorithm constituting the deep neural network may include giving, by the at least one processor, a reward value when an action value of the target output value is negative and the amount of stored solar energy remaining in the charging device is within a preset reference capacity range as a result of the solar energy being discharged from the charging device, and giving, by the at least one processor, a penalty value when an action value of the target output value is negative and the amount of stored solar energy remaining in the charging device is out of the preset reference capacity range as a result of the solar energy being discharged from the charging device.

According to an embodiment, the calculating, by the at least one processor, the reward value for controlling the solar energy management algorithm constituting the deep neural network may include giving, by the at least one processor, a reward value when the load power amount is greater than or equal to half of the maximum load power amount, the average selling price is less than the consumption price, and the solar energy is discharged because an action value of the target output value is negative, and giving, by the at least one processor, a penalty value when the load power amount is greater than or equal to half of the maximum load power amount, the average selling price is less than the consumption price, and the solar energy is stored because the action value of the target output value is positive.

According to an embodiment, the calculating, by the at least one processor, the reward value for controlling the solar energy management algorithm constituting the deep neural network may include giving, by the at least one processor, a reward value when the load power amount is greater than or equal to half of the maximum load power amount, the average selling price is greater than or equal to the consumption price, and the solar energy is discharged because an action value of the target output value is negative, and giving, by the at least one processor, a penalty value when the load power amount is greater than or equal to half of the maximum load power amount, the average selling price is greater than or equal to the consumption price, and the solar energy is stored because the action value of the target output value is positive.

According to an embodiment, the calculating, by the at least one processor, the reward value for controlling the solar energy management algorithm constituting the deep neural network may include giving, by the at least one processor, a reward value when the selling price of the solar energy is equal to or greater than the average selling price, and the solar energy is discharged because an action value of the target output value is negative, and giving, by the at least one processor, a penalty value when the selling price of the solar energy is equal to or greater than the average selling price, and the solar energy is stored because the action value of the target output value is positive.

According to an embodiment, the calculating, by the at least one processor, the reward value for controlling the solar energy management algorithm constituting the deep neural network may include giving, by the at least one processor, a reward value when the selling price of the solar energy is less than the average selling price, and the solar energy is stored because an action value of the target output value is positive, and giving, by the at least one processor, a penalty value when the selling price of the solar energy is less than the average selling price, and the solar energy is discharged because the action value of the target output value is negative.

According to an embodiment, the calculating, by the at least one processor, the reward value for controlling the solar energy management algorithm constituting the deep neural network may include giving, by the at least one processor, a reward value when an action value of the target output value is positive and the amount of stored solar energy stored in the charging device is within a preset reference capacity range as a result of the solar energy being stored in the charging device, and giving, by the at least one processor, a penalty value when the action value of the target output value is positive and the amount of stored solar energy stored in the charging device is out of the preset reference capacity range as a result of the solar energy being stored in the charging device.

According to an embodiment, the calculating, by the at least one processor, the reward value for controlling the solar energy management algorithm constituting the deep neural network may include giving, by the at least one processor, a reward value when the load power amount is less than the amount of generated solar energy and the solar energy is stored in the charging device because an action value of the target output value is positive, and giving, by the at least one processor, a penalty value when the load power amount is greater than or equal to the amount of generated solar energy and the solar energy is stored in the charging device because the action value of the target output value is positive.

According to an embodiment, a solar energy management system using deep reinforcement learning includes at least one processor, and the at least one processor includes an input unit that receives at least one piece of energy information data for deep reinforcement learning of a deep neural network, an energy operation scheduling unit that inputs the at least one piece of energy information data as input data of a solar energy management algorithm constituting the deep neural network to perform the deep reinforcement learning and determine a schedule for storing, discharging, consuming, or selling solar energy, and a control unit that calculates a reward value for controlling the solar energy management algorithm and performs the deep reinforcement learning by inputting the at least one piece of energy information data as the input data of the solar energy management algorithm.

According to an embodiment, there is provided a computer-readable non-transitory recording medium recording a program for executing the solar energy management method using deep reinforcement learning according to an embodiment.

BRIEF DESCRIPTION OF THE FIGURES

The above and other objects and features of the present disclosure will become apparent by describing in detail embodiments thereof with reference to the accompanying drawings.

FIGS. 5A to 5E are diagrams showing results of operating a solar energy management system according to a schedule determined using deep reinforcement learning according to an embodiment of the present disclosure.

DETAILED DESCRIPTION

Figure 1:
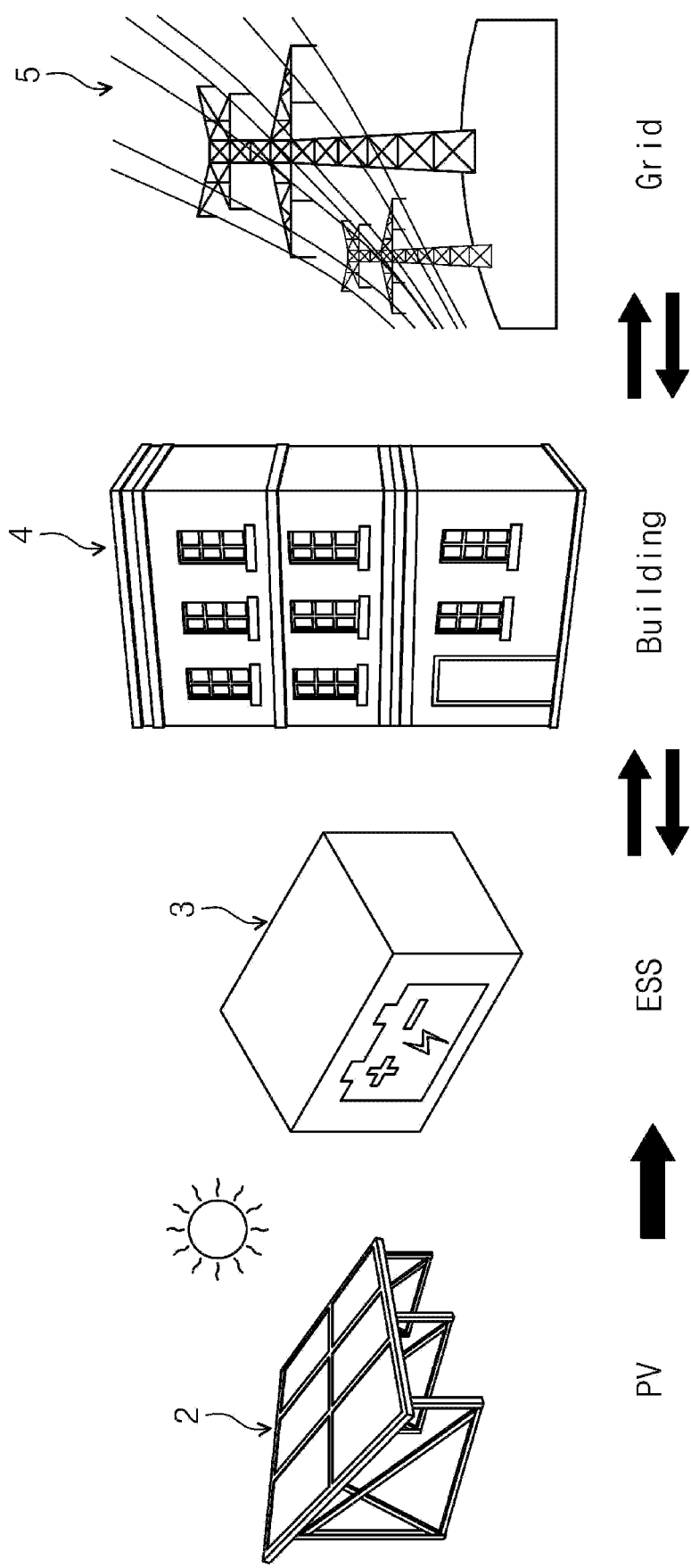
FIG. 1 is a schematic diagram schematically showing a photovoltaic (PV) system, a charging device 3, a target building, and a power grid according to an embodiment of the present disclosure.

Hereinafter, with reference to the accompanying drawings, various embodiments of the present disclosure will be described in detail such that those of ordinary skill in the art can easily carry out the present disclosure. The present disclosure may be embodied in several different forms and is not limited to the embodiments described herein.

In order to clearly explain the present disclosure, parts irrelevant to the present disclosure are omitted, and the same reference numerals are assigned to the same or similar elements throughout the specification. Accordingly, the reference numerals described above may be used in other drawings as well.

Further, in the drawings, a size, and a thickness of each element are arbitrarily illustrated for convenience of description, and the present disclosure is not necessarily limited to those illustrated in the drawings. In the drawings, the thicknesses of layers and regions are enlarged for clarity.

The expression "the same" means to "substantially the same". That is, it may be the same degree to the extent that ordinary knowledge those of ordinary skill in the art can convince that they are the same. Other expressions may be expressions in which "substantially" is omitted.

In addition, throughout the specification, unless explicitly described to the contrary, the word "comprise" and variations such as "comprises" or "comprising" will be understood to imply the inclusion of stated elements but not the exclusion of any other elements. As used throughout this specification, '~ unit' is a unit that processes at least one function or operation, and may refer to, for example, a software component, FPGA or a hardware component. A function provided by a component and '~ unit' may be performed separately by a plurality of components and '~ unit', or may be integrated with other additional components. '~ unit' may be configured to reside in an addressable storage medium or may be configured to reproduce one or more processors. Hereinafter, embodiments of the present disclosure will be described in detail with reference to the accompanying drawings.

FIG. 1 is a schematic diagram schematically showing a photovoltaic (PV) system, a charging device 3, a target building, and a power grid according to an embodiment of the present disclosure.

Referring to FIG. 1, a photovoltaic system 2 may include a photovoltaic panel. The photovoltaic system 2 may perform photovoltaic power generation using sunlight to generate solar energy.

The photovoltaic system may be installed on the roof or surrounding area of a target building 4, but the present disclosure is not limited thereto. The photovoltaic system 2 may be installed in another area spaced apart from the target building 4, and may provide solar energy to the target building 4 or a power grid 5.

Hereinafter, description will be given under the assumption that the photovoltaic system 2 is installed in the target building 4.

A charging device 3 (Energy Storage System: ESS) may store solar energy generated by the photovoltaic system 2. The charging device 3 may discharge the stored solar energy and provide the stored solar energy to the target building 4. Alternatively, the charging device 3 may discharge the stored solar energy and provide (or sell) the stored solar energy to a power company or the like through the power grid 5 or a grid.

The target building 4 may be a residential building. The target building 4 may use solar energy provided from the charging device 3 as an energy source.

The power grid 5 may connect the target building 4, the charging device 3, a power company, and the like.

Electric energy may be supplied to the target building 4 from the power company or the like through the power grid 5. Solar energy may be provided (or sold) from the charging device 3 to a power company or the like through the power grid 5.

Figure 2:
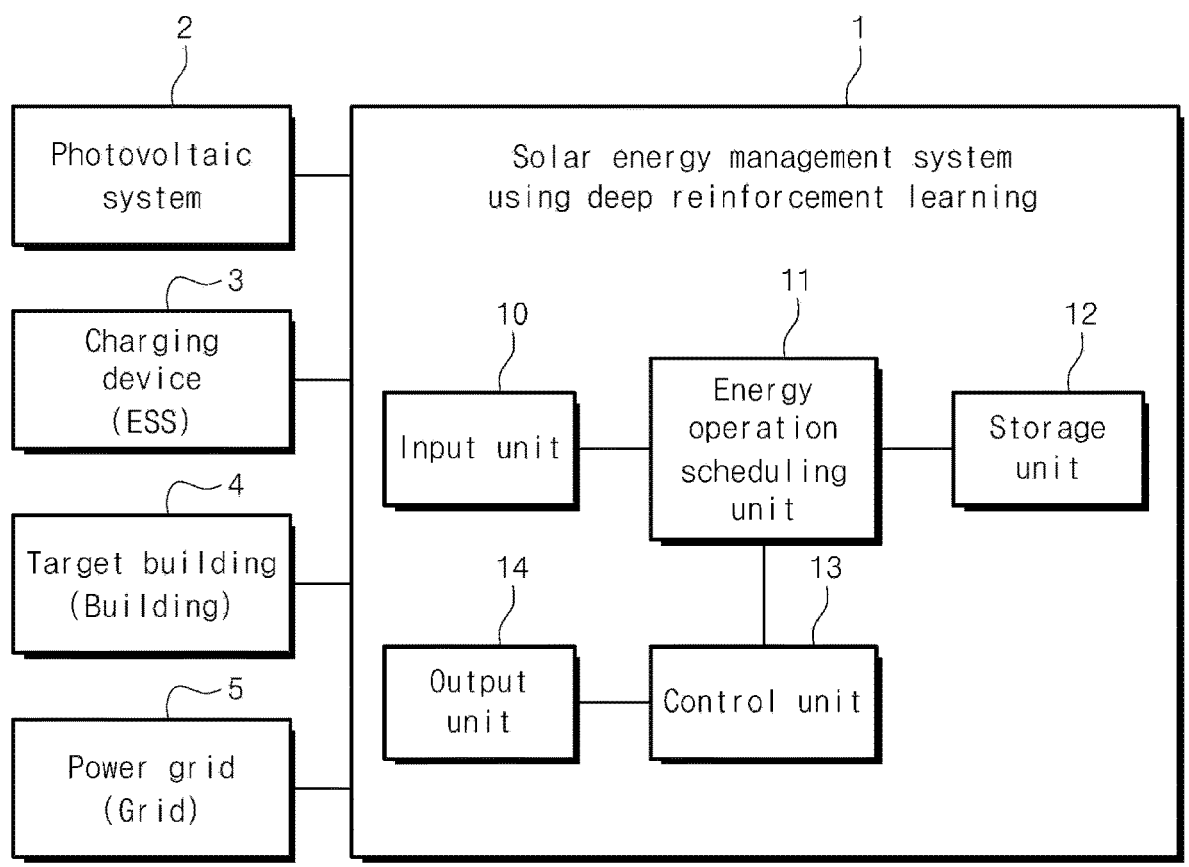
FIG. 2 is a diagram showing a solar energy management system using deep reinforcement learning according to an embodiment of the present disclosure.

FIG. 2 is a diagram showing a solar energy management system using deep reinforcement learning according to an embodiment of the present disclosure.

A solar energy management system 1 using deep reinforcement learning according to an embodiment of the present disclosure may include an input unit 10, an energy operation scheduling unit 11, a storage unit 12, a control unit 13, and an output unit 14.

The solar energy management system 1 using deep reinforcement learning according to an embodiment of the present disclosure may be connected to the photovoltaic system 2, the charging device 3, the target building 4, and the power grid 5.

The input unit 10 may receive at least one or more pieces of energy information data for deep reinforcement learning for use in the deep neural network from the photovoltaic system 2, the charging device 3, the target building 4, and the power grid 5.

Specifically, the input unit 10 may receive the amount of generated solar energy from the photovoltaic system 2. The input unit 10 may receive a load power amount measured from the target building 4. The input unit 10 may receive the amount of stored solar energy from the charging device 3.

The input unit 10 may receive the selling price of solar energy from the power grid 5. The input unit 10 may receive an average selling price, which is an average value of the selling prices of solar energy, from the power grid 5.

The input unit 10 may receive the consumption price of power consumed in the target building 4 according to the load power amount. The input unit 10 may receive the maximum load power amount measured in the target building 4.

The input unit 10 may provide the amount of generated solar power, the load power amount, the amount of stored solar energy, the selling price of solar energy, the average selling price, the consumption price, and the maximum load power amount, which are received from the photovoltaic system 2, the charging device 3, the target building 4 and the power grid 5, to the energy operation scheduling unit 11.

Figure 3:
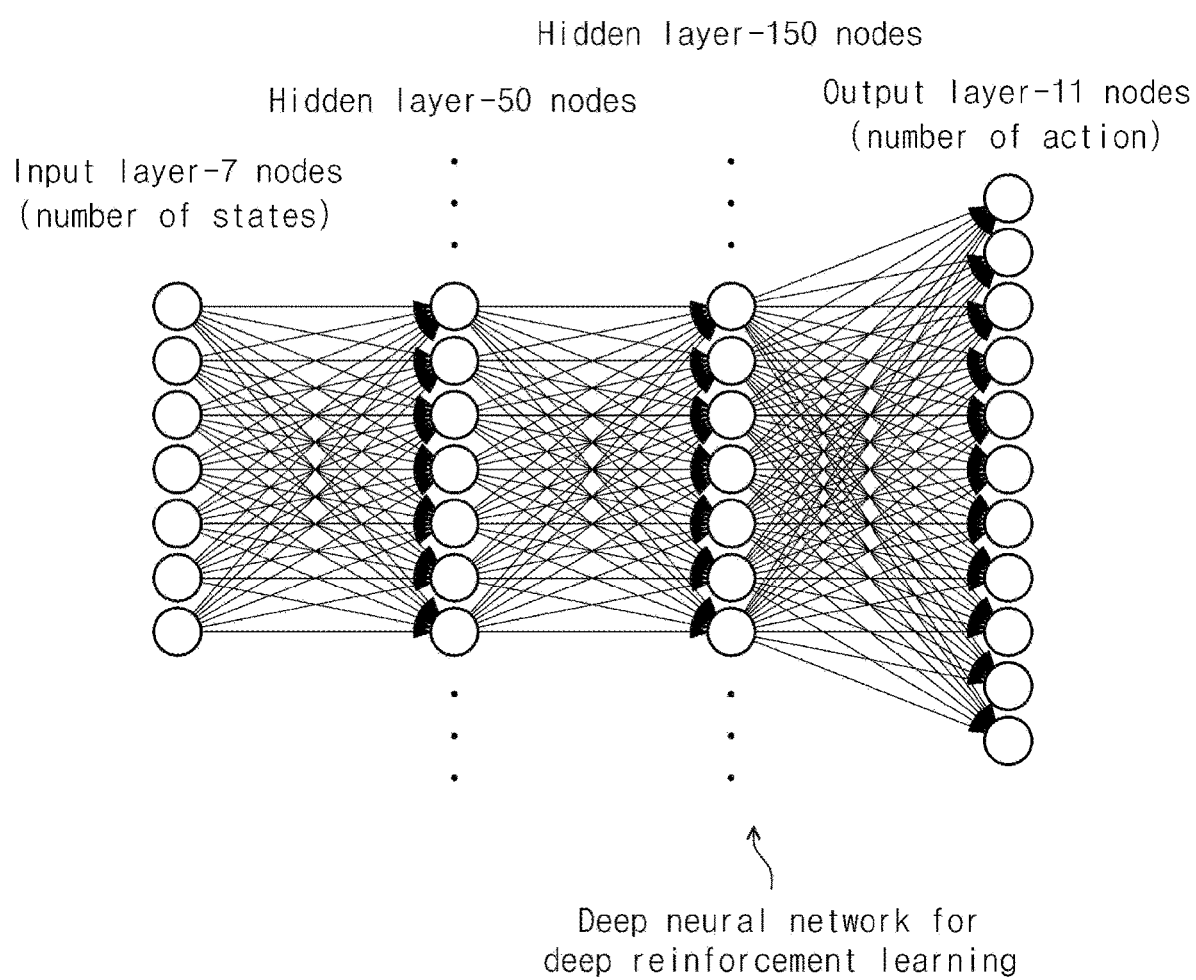
FIG. 3 is a schematic diagram of a deep neural network performing deep reinforcement learning according to an embodiment of the present disclosure.

The energy operation scheduling unit 11 may include a deep neural network for performing deep reinforcement learning (DEEP REINFORCEMENT LEARNING) (see FIG. 3). In this case, the deep neural network for performing deep reinforcement learning (DEEP REINFORCEMENT LEARNING) may be implemented by a solar energy management algorithm.

The energy operation scheduling unit 11 may input, to solar energy management algorithm, energy information data including the amount of generated solar power, the load power amount, the amount of stored solar energy, the selling price of solar energy, the average selling price, the consumption price, and the maximum load power amount, which are provided from the input unit 10, as input data.

The energy operation scheduling unit 11 may determine a schedule for charging, discharging, consuming, or selling solar energy by inputting the energy information data as input data.

By inputting the energy information data as input data, the energy operation scheduling unit 11 may calculate a reward value for controlling the solar energy management algorithm and perform deep reinforcement learning in the deep neural network.

Hereinafter, a process in which the energy operation scheduling unit 11 determines a schedule for charging, discharging, consuming, or selling solar energy using the energy information data as input data will be described.

The energy operation scheduling unit 11 may be provided with a deep neural network for deep reinforcement learning (DEEP REINFORCEMENT LEARNING). In this case, the deep neural network for deep reinforcement learning may be implemented by a solar energy management algorithm, which has been separately coded.

The deep reinforcement learning (DEEP REINFORCEMENT LEARNING) refers to a type of machine learning that acquires a desired target value by performing repeated learning several times. In the deep reinforcement learning process, a reward value or a penalty value is given, and in this process, learning is performed to maximize the reward value.

The total sum of reward values that may be acquired in the deep reinforcement learning process is called Q-Value, and Q-Value(Q(s,a)) can be expressed by [Equation 1] below.

$$Q(s,a) = r(s,a) + \gamma * \max Q(s',a') \quad \text{[Equation 1]}$$

In Equation 1, r(s,a) represents a reward value that may be received immediately when action "a" is taken in the current state "s". γ represents the depreciation rate. s' represents the next state reached by taking action "a" in the current state "s", and max Q(s',a') represents the maximum reward value that may be received in the next state s'.

When the energy information data is input as the input value of the solar energy algorithm (or when the energy information data is input to a node of the input layer of the deep neural network), various Q-Values (hereinafter referred to as output values) may be output.

Hereinafter, it is assumed that coding has been made in the solar energy management algorithm so as to discharge the solar energy stored in the charging device 3 when the action value of the Q-Value is negative and store solar energy in the charging device 3 when the action value of the Q-Value is positive.

The energy operation scheduling unit 11 may determine, as a target output value, the largest output value of the Q-Value for the input value and the action value from among output values.

That is, the energy operation scheduling unit 11 may perform scheduling so as to select the largest output value of the Q-Value for the input value and the action value among the output values (Q-Values) as the target output value and take an action.

When the action value of the target output value is positive and the amount of generated solar energy in the photovoltaic system 2 is equal to or greater than the load power amount in the target building 4, the energy operation scheduling unit 11 may determine a schedule for storing solar energy in the charging device 3.

Specifically, during the daytime, the load power amount in the target building 4 is very small. On the other hand, the amount of generated solar energy in the photovoltaic system 2 is high. In this case, since the action value of the target output value is positive, the energy operation scheduling unit 11 may determine a schedule for storing the solar energy generated by the photovoltaic system 2 in the charging device 3.

The action value of the target output value is negative, the load power amount in the target building 4 is equal to or greater than half (50%) of the maximum load power amount in the target building 4, and the average selling price for the power grid 5 is less than the consumption price in the target building 4, the energy operation scheduling unit 11 may determine a schedule for discharging the solar energy stored in the charging device 3 and allowing the target building 4 to consume the solar energy.

Specifically, the load power amount in the target building 4 is increased during the afternoon time. In this case, when the load power amount in the target building 4 is equal to or greater than half (50%) of the maximum load power amount, the energy operation scheduling unit 110 may determine whether to allow the target building 4 to consume the solar energy stored in the charging device 3 or to sell the solar energy to the power grid 5.

In this case, it is desirable to consume the solar energy in the target building 4 rather than to sell the solar energy to the power grid 5 when the average selling price in the power grid 5 is less than the consumption price in the target building 4.

Accordingly, the energy operation scheduling unit 11 may determine a schedule for allowing the target building 4 to consume the solar energy stored in the charging device 3.

On the other hand, when the action value of the target output value is negative, the load power amount in the target building 4 is equal to or greater than half (50%) of the maximum load power amount in the target building 4, and the average selling price for the power grid 5 is equal to or greater than the consumption price in the target building 4, the energy operation scheduling unit 11 may determine a schedule for discharging the solar energy stored in the charging device 3 and selling the solar energy to the power grid 5.

Specifically, it is desirable to sell the solar energy to the power grid 5 rather than to consume the solar energy in the target building 4 when the average selling price in the power grid 5 is greater than or equal to the consumption price in the target building 4.

Accordingly, the energy operation scheduling unit 11 may determine a schedule for selling the solar energy stored in the charging device 3 to the power grid 5.

Hereinafter, a process will be described, in which the energy operation scheduling unit 11 may calculate a reward value for controlling the solar energy management algorithm and perform deep reinforcement learning in the deep neural network by inputting the energy information data as input data.

Specifically, as described above, the deep neural network provided in the energy operation scheduling unit 11 may input energy information data as input data to output one or more output values (or value function values). In addition, the deep neural network provided in the energy operation scheduling unit 11 may repeatedly perform deep reinforcement learning using an error function (Cost) including output values (or value function values).

The error function (Cost) may be expressed by [Equation 2] below.

$$\text{Cost} = [Q(s,a;\theta) - (r(s,a) + \gamma * \max Q(s',a';\theta))]^2 \quad \text{[Equation 2]}$$

In Equation 2, Q(s,a;θ) represents an output value (or a value function value) when action "a" is taken in the current state "s".

Q(s', a'; θ) represents a target value in the deep reinforcement learning process. r*maxQ(s', a'; θ) is an expression obtained by multiplying the expression in which the output value (or value function value) is the maximum in the next state s' by the depreciation rate (γ).

θ represents a parameter, and the above-described output value (or value function value) may be defined by the parameter θ. Specifically, θ represents the weight and bias values of the deep neural network.

The energy operation scheduling unit 11 may determine the schedule for storing, discharging, consuming, or selling solar energy and at the same time, repeatedly perform deep reinforcement learning using the error function (Cost) as described above to improve accuracy.

The energy operation scheduling unit 11 may give a reward value when the action value of the target output value is negative and the amount of solar energy stored in the charging device 3 is within a preset reference capacity range as a result of the solar energy being discharged from the charging device 3.

The energy operation scheduling unit 11 may give a penalty value when the action value of the target output value is negative and the amount of solar energy stored in the charging device 3 is out of a preset reference capacity range as a result of the solar energy being discharged from the charging device 3.

Specifically, when the action value of the target output value is negative, the solar energy stored in the charging device 3 may be discharged in response to the schedule determined by the energy operation scheduling unit 11. In this case, the energy operation scheduling unit 11 may determine whether the amount of stored solar energy remaining in the charging device 3 thus discharged is within the preset reference capacity range.

When the amount of stored solar energy remaining in the charging device 3 is within the preset reference capacity range, the energy operation scheduling unit 11 may determine that the deep reinforcement learning of the deep neural network has been correctly performed toward the target value (that is, determine that over-discharge is not made) and give a reward value.

When the amount of stored solar energy remaining in the charging device 3 is out of the preset reference capacity range, the energy operation scheduling unit 11 may determine that the deep reinforcement learning of the deep neural network has been incorrectly performed toward the target value (that is, determine that over-discharge is made) and give a penalty value.

The energy operation scheduling unit 11 may give a reward value when the load power amount of the target building 4 is equal to or greater than half (50%) of the maximum load power amount, and the average selling price in the power grid 5 is less than the consumption price in the target building 4, and the solar energy is discharged from the charging device 3 because the action value of the target output value is output as a negative number.

In this case, the reward value may correspond to a product of the consumption price in the target building 4 and the amount of stored solar energy, which has been discharged from the charging device 3.

The energy operation scheduling unit 11 may give a penalty value when the load power amount of the target building 4 is equal to or greater than half (50%) of the maximum load power amount, and the average selling price in the power grid 5 is less than the consumption price in the target building 4, but the solar energy is stored in the charging device 3 because the action value of the target output value is output as a positive number.

In this case, the penalty value has a negative value and may correspond to a product of the consumption price in the target building 4 and the amount of stored solar energy, which has been discharged from the charging device 3.

Specifically, as described above, it is desirable to discharge the solar energy stored in the charging device 3 and allow the target building 4 to consume the solar energy, when the load power amount of the target building 4 is equal to or greater than half (50%) of the maximum load power amount and the average selling price in the power grid 5 is less than the consumption price in the target building 4.

Therefore, when the solar energy is discharged from the charging device 3 because the action value of the target output value is negative in the solar energy management algorithm, the energy operation scheduling unit 11 may give the above-described reward value to the deep neural network.

On the other hand, when the solar energy is stored in the charging device 3 because the action value of the target output value is positive in the solar energy management algorithm, the energy operation scheduling unit 11 may give the above-described penalty value to the deep neural network.

The energy operation scheduling unit 11 may give a reward value when the load power amount of the target building 4 is equal to or greater than half (50%) of the maximum load power amount, and the average selling price in the power grid 5 is equal to or greater than the consumption price in the target building 4, and the solar energy is discharged from the charging device 3 because the action value of the target output value is output as a negative number.

In this case, the reward value may correspond to the product of the selling price of solar energy to the power grid 5 and the amount of stored solar energy, which has been discharged from the charging device 3.

The energy operation scheduling unit 11 may give a penalty value when the load power amount of the target building 4 is equal to or greater than half (50%) of the maximum load power amount, and the average selling price in the power grid 5 is equal to or greater than the consumption price in the target building 4, and the solar energy is stored in the charging device 3 because the action value of the target output value is output as a positive number.

In this case, the penalty has a negative value and may correspond to the product of the selling price of solar energy to the power grid 5 and the amount of stored solar energy, which has been discharged from the charging device 3.

Specifically, as described above, it is desirable to discharge the solar energy stored in the device 3 and sell the solar energy to the power grid 5, when the load power amount of the target building 4 is equal to or greater than half (50%) of the maximum load power amount and the average selling price in the power grid 5 is equal to or greater than the consumption price in the target building 4.

Therefore, when the solar energy is discharged from the charging device 3 because the action value of the target output value is negative in the solar energy management algorithm, the energy operation scheduling unit 11 may give the above-described reward value to the deep neural network.

On the other hand, when the solar energy is stored in the charging device 3 because the action value of the target output value is positive in the solar energy management algorithm, the energy operation scheduling unit 11 may give the above-described penalty value to the deep neural network.

The energy operation scheduling unit 11 may give a reward value when the selling price of solar energy to the power grid 5 is greater than the average selling price, which is the average value of the selling prices, and the solar energy is discharged from the charging device 3 because the action value of the target output value is negative.

In this case, the reward value may correspond to the product of the selling price of solar energy to the power grid 5 and the amount of stored solar energy, which has been discharged from the charging device 3.

The energy operation scheduling unit 11 may give a penalty value when the selling price of solar energy to the power grid 5 is greater than the average selling price, which is the average value of the selling prices, and the solar energy is stored in the charging device 3 because the action value of the target output value is positive.

In this case, the penalty value has a negative value and may correspond to the product of the selling price of solar energy to the power grid 5 and the amount of stored solar energy, which has been discharged from the charging device 3.

Specifically, it is desirable to sell the solar energy stored in the charging device 3 to the power grid 5 when the selling price of solar energy to the power grid 5 is greater than the average selling price.

Therefore, when the solar energy is discharged from the charging device 3 because the action of the target output value output from the solar energy algorithm is negative, the energy operation scheduling unit 11 may give the above-described reward value to the deep neural network.

On the other hand, when the solar energy is stored in the charging device 3 because the action value of the target output value output from the solar energy algorithm is positive, the energy operation scheduling unit 11 may give the above-described penalty value to the deep neural network.

The energy operation scheduling unit 11 may give a reward value when the selling price of solar energy to the power grid 5 is less than the average selling price, which is the average value of the selling prices, and the solar energy is stored in the charging device 3 because the action value of the target output value is positive.

In this case, the reward value may correspond to a value obtained by subtracting the product of the selling price of solar energy to the power grid 5 and the amount of stored solar energy, which has been stored in the charging device 3 from the average selling price of solar energy to the power grid 5.

The energy operation scheduling unit 11 may give a penalty value when the selling price of solar energy to the power grid 5 is less than the average selling price, which is the average value of the selling prices, and the solar energy is discharged from the charging device 3 because the action value of the target output value is negative.

In this case, the penalty value has a negative value, and may correspond to a value obtained by subtracting the product of the selling price of solar energy to the power grid 5 and the amount of stored solar energy, which has been stored in the charging device 3 from the average selling price of solar energy to the power grid 5.

Specifically, it is desirable not to sell the solar energy stored in the charging device 3 to the power grid 5 when the selling price of solar energy to the power grid 5 is less than the average selling price.

Therefore, when the solar energy is stored in the charging device 3 because the action value of the target output value output from the solar energy algorithm is positive, the energy operation scheduling unit 11 may give the above-described reward value to the deep neural network.

On the other hand, when the solar energy is discharged from the charging device 3 because the action value of the target output value output from the solar energy algorithm is negative, the energy operation scheduling unit 11 may give the above-described penalty value to the deep neural network.

The energy operation scheduling unit 11 may assign a reward value when the action value of the target output value is negative and the amount of solar energy stored in the charging device 3 is within the preset reference capacity range as a result of the solar energy being stored in the charging device 3.

The energy operation scheduling unit 11 may give a penalty value when the action value of the target output value is positive and the amount of solar energy stored in the charging device 3 is out of the preset reference capacity range as a result of the solar energy being stored in the charging device 3.

Specifically, when the action value of the target output value is positive, the solar energy may be stored in the charging device 3 in response to the schedule determined by the energy operation scheduling unit 11. In this case, the energy operation scheduling unit 11 may determine whether the amount of stored solar energy stored in the charging device 3 is within the preset reference capacity range.

When the amount of stored solar energy in the charging device 3 is within the preset reference capacity range, the energy operation scheduling unit 11 may determine that the deep reinforcement learning of the deep neural network has been performed toward the target value (that is, determine that over-charge is not made) and give a reward value.

When the amount of stored solar energy in the charging device 3 is out of the preset reference capacity range, the energy operation scheduling unit 11 may determine that the deep reinforcement learning of the deep neural network has been incorrectly performed toward the target value (that is, determine that over-discharge is made) and give a penalty value.

The energy operation scheduling unit 11 may give a reward value when the load power amount of the target building 4 is less than the amount of generated solar energy of the photovoltaic system 2, and the solar energy is stored in the charging device 3 because the action value of the target output value is positive.

The energy operation scheduling unit 11 may give a penalty value when the load power amount of the target building 4 is equal to or greater than the amount of generated solar energy of the photovoltaic system 2, and the solar energy is stored in the charging device 3 because the action value of the target output value is positive.

Specifically, the load power amount of the target building 4 may be low during the daytime or the like. In this case, it is desirable to store the solar energy in the charging device 3 when the load power amount of the target building 4 is less than the amount of generated solar energy of the photovoltaic system 2.

Therefore, when the action value of the target output value output from the solar energy management algorithm is positive and the solar energy is stored in the charging device 3, the energy operation scheduling unit 11 may give the above-described reward value to the deep neural network.

On the other hand, the load power amount of the target building 4 may be high during the afternoon time. In this case, it is desirable to discharge the solar energy from the charging device 3 to allow target building 4 to consume the solar energy or to sell the solar energy to the power grid 5 when the load power amount of the target building 4 is equal to or greater than the amount of generated solar energy of the photovoltaic system 2.

Therefore, when the action value of the target output value output from the solar energy management algorithm is positive and the solar energy is stored in the charging device 3, the energy operation scheduling unit 11 may give the above-described penalty value to the deep neural network.

The control unit 13 may provide a control signal for controlling the photovoltaic system 2, the charging device 3, the target building 4, and the power grid 5 according to the schedule determined by the energy operation scheduling unit 11.

For example, when the energy operation scheduling unit 11 determines a schedule for storing solar energy in the charging device 3, the control unit 13 may generate a control signal for storing the solar energy generated by the photovoltaic system 2 in the charging device 3.

When the energy operation scheduling unit 11 determines a schedule for discharging solar energy from the charging device 3, the control unit 13 may generate a control signal for discharging the solar energy stored in the charging device 3.

When the energy operation scheduling unit 11 determines a schedule for allowing the target building 4 to consume solar energy, the control unit 13 generates a control signal for discharging the solar energy stored in the charging device 3 and providing the solar energy to the target building 4.

When the energy operation scheduling unit 11 determines a schedule for selling solar energy to the power grid 5, the control unit 13 generates a control signal for discharging the solar energy stored in the charging device 3 and selling the solar energy to the power grid 5.

The output unit 14 may receive the control signal from the control unit 13 and provide the control signal to the photovoltaic system 2, the charging device 3, the target building 4, and the power grid 5.

FIG. 3 is a schematic diagram of a deep neural network performing deep reinforcement learning according to an embodiment of the present disclosure.

The deep neural network performing deep reinforcement learning may include an input layer, one or more hidden layers, and an output layer.

The input layer may consist of 7 nodes. Any one of the one or more hidden layers may consist of 50 nodes. Another one of the one or more hidden layers may consist of 150 nodes. The output layer may consist of 11 nodes.

Although it is illustrated in FIG. 3 that the input layer consists of 7 nodes, one hidden layer consists of 50 nodes, the other hidden layer consists of 150 nodes, and the output layer consists of 11 nodes, this is one example and the layer may consist of various nodes.

In addition, the deep neural network for performing deep reinforcement learning as described above in FIG. 2 may be implemented by a solar energy management algorithm.

The amount of generated solar power, the load power amount, the amount of stored solar energy, the selling price of solar energy, the average selling price, the consumption price, and the maximum load power amount, which are provided from the input unit 10, may be input to the seven nodes of the input layer, respectively.

Each of the 11 nodes of the output layer of the deep neural network may output an output value (Q-Value).

The energy operation scheduling unit 11 may determine the largest output value of the Q-Value for the input value and the action value among the output values as the target output value.

The energy operation scheduling unit 11 may determine a schedule for discharging solar energy stored in the charging device 3 when the action value of the target output value is negative, and storing solar energy in the charging device 3 when the action value of the target output value is positive.

On the other hand, the deep neural network that performs deep reinforcement learning may perform deep reinforcement learning using a reward value in addition to the action of determining a schedule as described above, thus increasing accuracy.

Figure 4A:
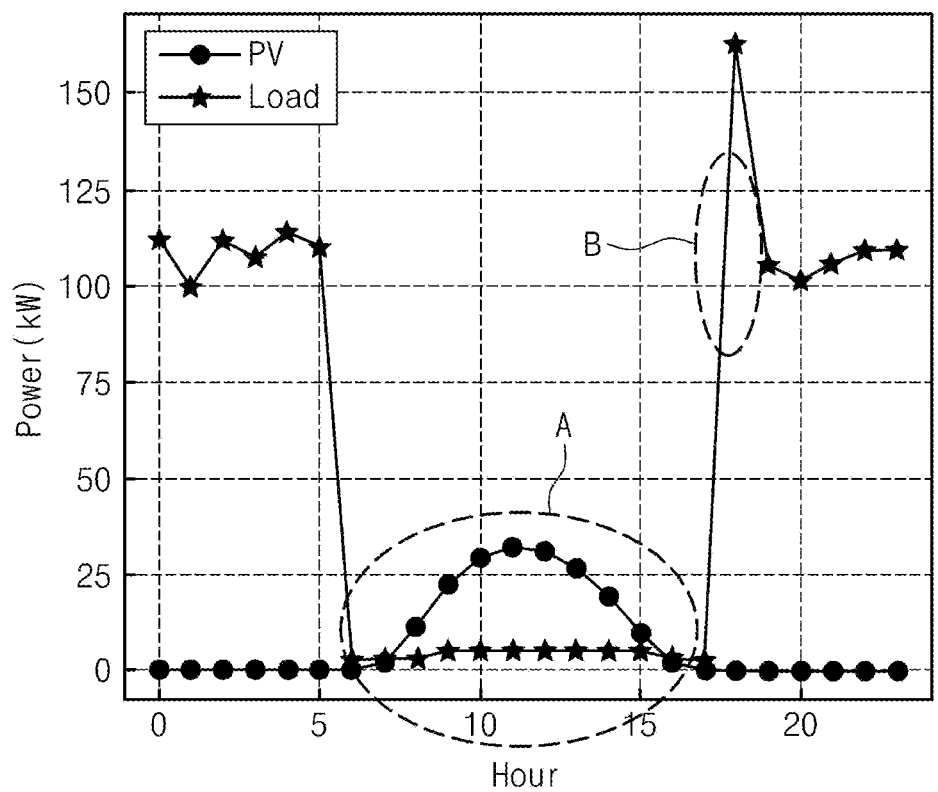
FIGS. 4A and 4B are diagrams for describing a process of determining a schedule for storing, discharging, consuming, or selling solar energy using deep reinforcement learning according to an embodiment of the present disclosure.
Figure 4B:
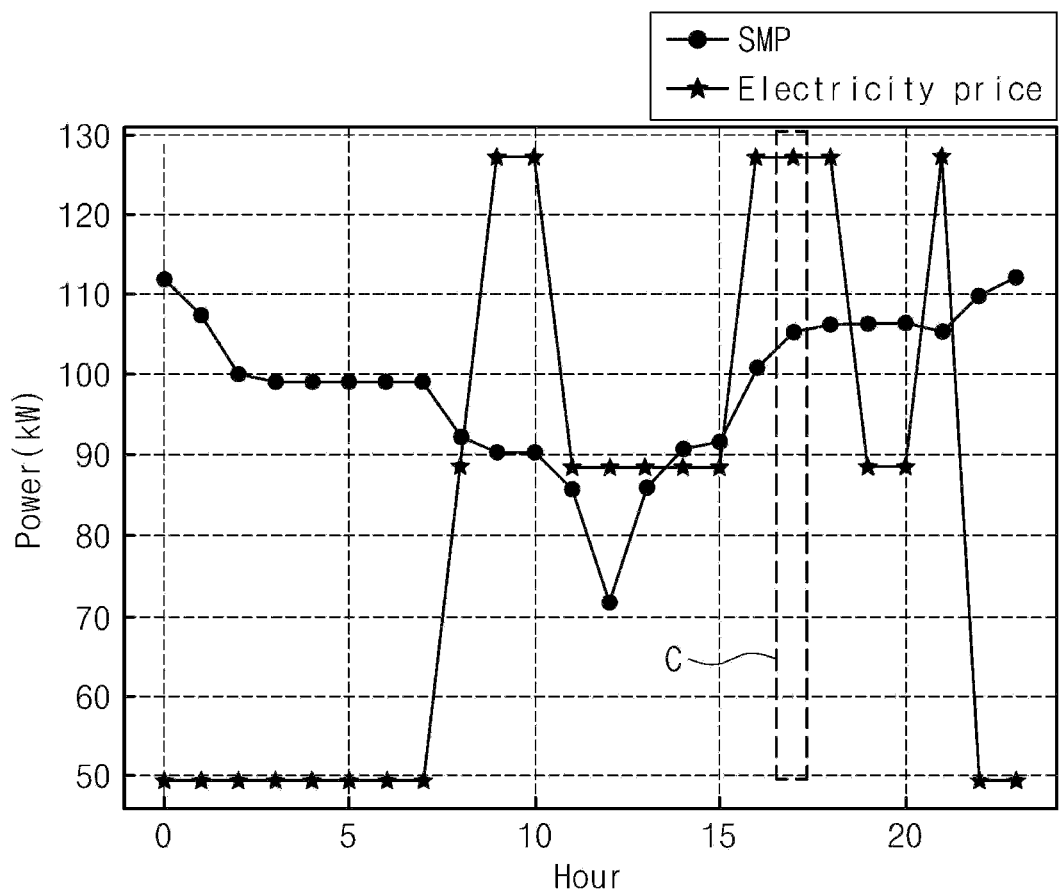

FIGS. 4A and 4B are diagrams for describing a process of determining a schedule for storing, discharging, consuming, or selling solar energy using deep reinforcement learning according to an embodiment of the present disclosure.

FIG. 4A is a graph showing the amount of solar energy generated by the photovoltaic system 2, the load power amount measured in the target building 4, and the maximum load power amount measured in the target building 4 over time.

FIG. 4B is a graph showing the selling price of solar energy to the power grid 5 and the consumption price of solar energy in the target building 4 over time.

Referring to FIG. 4A, since the amount of solar radiation is large from 9:00 am to 3:00 pm (A), the amount of solar energy generated by the photovoltaic system 2 is high. On the other hand, the load power amount in the target building 4 is very small.

Since the amount of solar radiation decreases after 4:00 pm (B), the amount of solar energy generated by the photovoltaic system 2 is small. On the other hand, the amount of power used increases in the target building 4, and the load power amount is rapidly increased. In this case, the maximum load power amount is measured in the target building 4 during 7:00 μm to 8:00 pm.

The artificial intelligence learning network may perform deep reinforcement learning to determine a schedule for storing solar energy in the charging device 3 when the amount of generated solar energy in the photovoltaic system 2 is equal to or greater than the load power amount in the target building 4 (A).

In this case, the energy operation scheduling unit 11 may give a reward value to the artificial intelligence learning network to perform deep reinforcement learning when the load power amount is less than the amount of generated solar energy and the solar energy is stored in the charging device 3 because the action value of the target output value is positive.

On the other hand, the energy operation scheduling unit 11 may give a penalty value to the artificial intelligence learning network when the load power amount is equal to or greater than the amount of generated solar energy and the solar energy is stored in the charging device 3 because the action value of the target output value is positive.

On the other hand, the artificial intelligence learning network may perform deep reinforcement learning to determine a schedule for discharging solar energy from the charging device 3 when the load power amount of the target building 4 is greater than or equal to the amount of generated solar energy in the photovoltaic system 2.

In this case, the energy operation scheduling unit 11 may give a reward value to the artificial intelligence learning network to perform deep reinforcement learning when the action value of the target output value is negative and the amount of stored solar energy remaining in the charging device 3 is within a preset reference capacity range as a result of solar energy being discharged from the charging device 3.

On the other hand, the energy operation scheduling unit 11 may give a penalty value to the artificial intelligence learning network to perform deep reinforcement learning when the action value of the target output value is negative and the amount of stored solar energy remaining in the charging device 3 is out of a preset reference capacity range as a result of solar energy being discharged from the charging device 3.

The artificial intelligence learning network may perform deep reinforcement learning to determine a schedule for discharging solar energy from the charging device 3 and allowing the target building 4 to consume the solar energy or sell the solar energy to the power grid 5 when the load power amount in the target building 4 is equal to or greater than half (50%) of the maximum load power amount (B) and the action value of the target output value is negative.

In this case, the artificial intelligence learning network may perform deep reinforcement learning to determine a schedule for discharging solar energy from the charging device 3 and allowing the target building 4 to consume the solar energy when the average selling price to the power grid 5 is less than the consumption price in the target building 4.

In addition, the energy operation scheduling unit 11 may perform deep reinforcement learning by giving a reward value to the artificial intelligence learning network when the load power amount is equal to or greater than half (50%) of the maximum load power amount, the average selling price is less than the consumption price, and the solar energy is discharged from the charging device 3 because the action value of the target output value is negative.

On the other hand, the energy operation scheduling unit 11 may perform deep reinforcement learning by giving a penalty value to the artificial intelligence learning network when the load power amount is equal to or greater than half (50%) of the maximum load power amount, the average selling price is less than the consumption price, and the solar energy is stored in the charging device 3 because the action value of the target output value is positive.

The artificial intelligence learning network may perform deep reinforcement learning to determine a schedule for discharging solar energy from the charging device 3 and selling the solar energy to the power grid 5 when the average selling price to the power grid 5 is greater than or equal to the consumption price in the target building 4.

The energy operation scheduling unit 11 may perform deep reinforcement learning by giving a reward value to the artificial intelligence learning network when the load power amount is equal to or greater than half (50%) of the maximum load power amount, the average selling price is equal to or greater than the consumption price, and the solar energy is discharged from the charging device 3 because the action value of the target output value is negative.

On the other hand, the energy operation scheduling unit 11 may perform deep reinforcement learning by giving a penalty value to the artificial intelligence learning network when the load power amount is equal to or greater than half (50%) of the maximum load power amount, the average selling price is equal to or greater than the consumption price, and the solar energy is discharged from the charging device 3 because the action value of the target output value is positive.

FIGS. 5A to 5E are diagrams showing results of operating a solar energy management system according to a schedule determined using deep reinforcement learning according to an embodiment of the present disclosure.

Figure 5A:
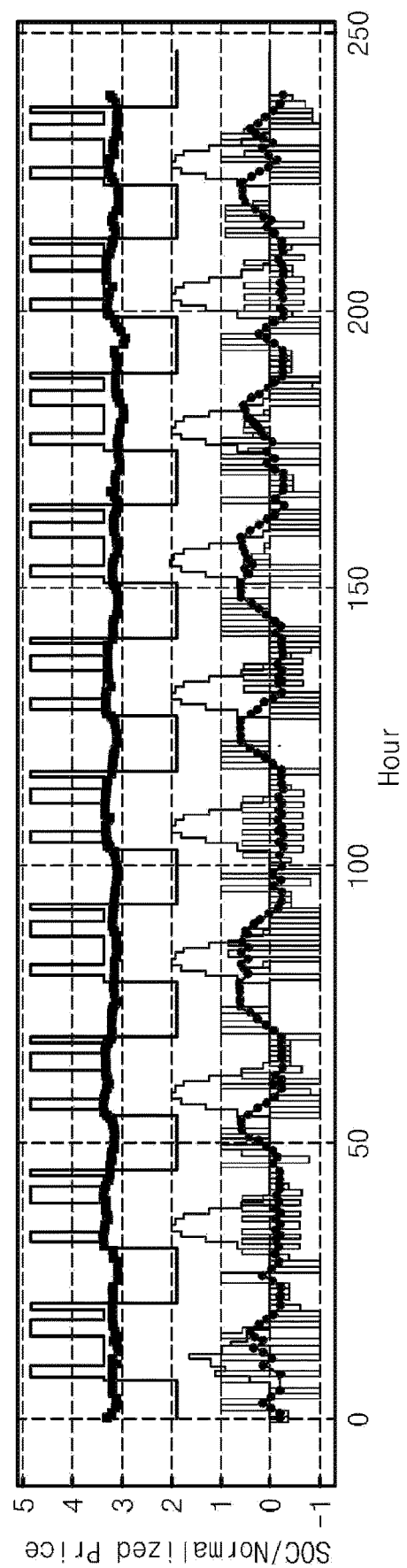
Figure 5B:
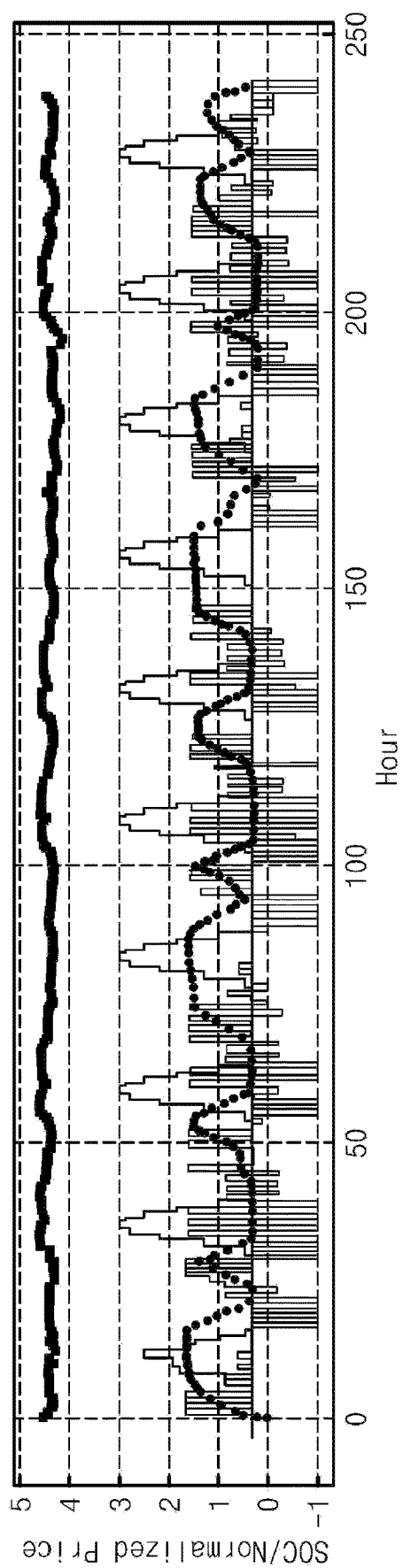
Figure 5C:
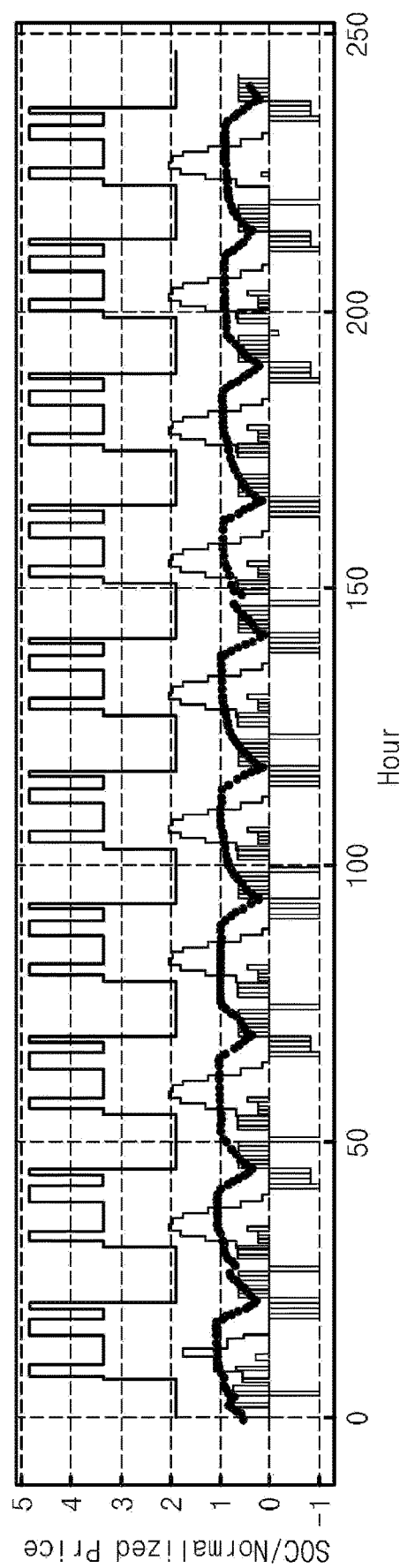
Figure 5D:
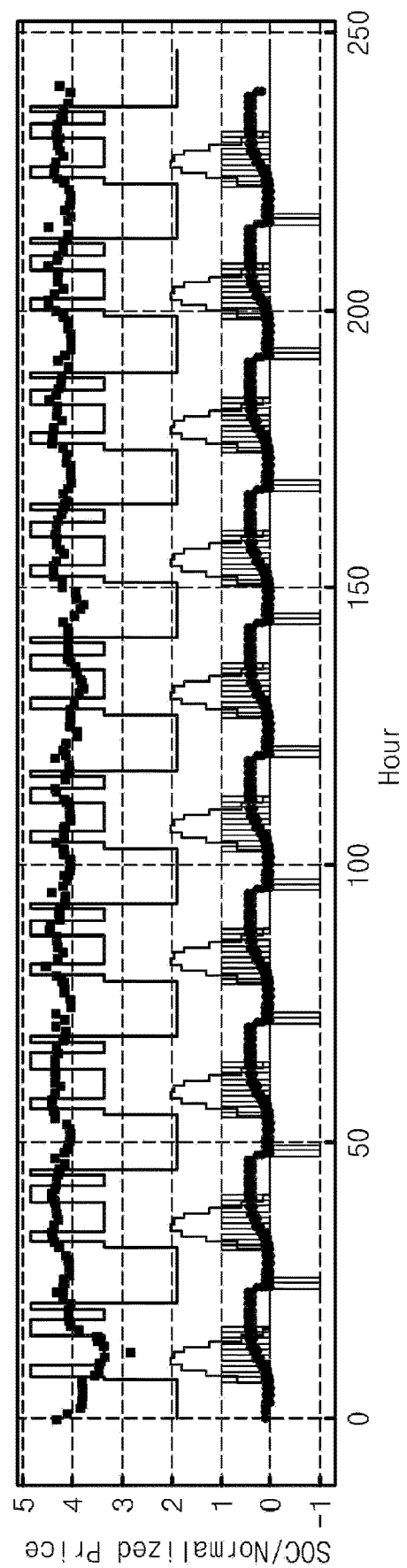

FIG. 5A is a result of operating a solar energy management system using deep reinforcement learning according to an embodiment of the present disclosure. FIG. 5B is a result of operating the solar energy management system using deep reinforcement learning in consideration of only a selling price to the power grid unlike the present disclosure. FIG. 5C is a result of operating the solar energy management system using deep reinforcement learning in consideration of only a consumption price in a target building unlike the present disclosure. FIG. 5D is a result of operating the solar energy management system using a rule-based learning approach.

FIG. 5E is a table showing financial profits respectively obtained by operating the solar energy management system using deep reinforcement learning in FIGS. 5A to 5D.

As can be seen from the table shown in FIG. 5E, the monetary benefit is $21,209 when operating the solar energy management system using deep reinforcement learning according to an embodiment of the present disclosure in FIG. 5A. The monetary benefit is $17,919 when operating the solar energy management system using deep reinforcement learning in consideration of only a selling price to the power grid.

The monetary benefit is $9,078 when operating the solar energy management system using deep reinforcement learning in consideration of only a consumption price in a target building. The monetary benefit is $3,725 when operating the solar energy management system using a rule-based learning approach.

That is, when deep reinforcement learning is performed by considering not only the consumption price in the target building but also the selling price to the power grid 5 as in the present disclosure, it is possible to maximize the financial profit, minimize the overall operating cost and perform the optimal energy transaction.

Figure 6:
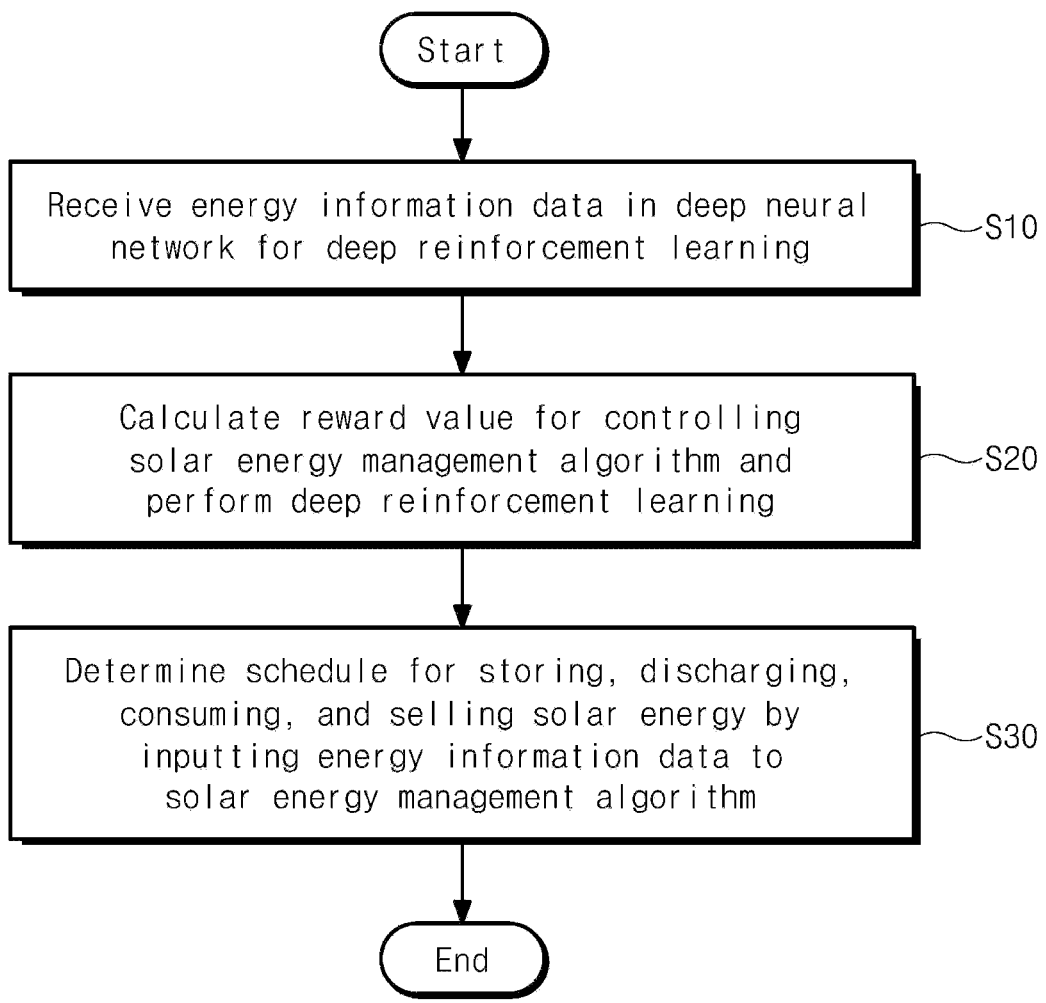
FIG. 6 is a flowchart of a solar energy management method using deep reinforcement learning according to an embodiment of the present disclosure.

FIG. 6 is a flowchart of a solar energy management method using deep reinforcement learning according to an embodiment of the present disclosure.

In step S10, a deep neural network for deep reinforcement learning may receive energy information data.

Specifically, the input unit 10 may receive the amount of generated solar power, the load power amount, the amount of stored solar energy, the selling price of solar energy, the average selling price, the consumption price, and the maximum load power.

In step S20, a reward value for controlling the solar energy management algorithm may be calculated and deep reinforcement learning may be performed.

In step S30, the energy information data may be input to the solar energy management algorithm to determine a schedule for storing, discharging, consuming, and selling solar energy.

Specifically, the energy operation scheduling unit 11 may input the energy information data to the solar energy management algorithm as input data.

The energy operation scheduling unit 11 may determine the largest output value among the output values of Q-Values for the input value and the action value of the solar energy management algorithm, as a target output value.

The energy operation scheduling unit 11 may determine a schedule for storing the solar energy in the charging device 3 when the action value of the target output value is positive.

The energy operation scheduling unit 11 may determine a schedule for discharging the solar energy stored in the charging device 3 when the action value of the target output value is negative.

In this case, when the load power amount is greater than or equal to half (50%) of the maximum load power amount and the average selling price is less than the consumption price, it is possible to determine a schedule for discharging solar energy and allowing the target building 4 to consume the solar energy.

On the other hand, when the load power amount is equal to or greater than half (50%) of the maximum load power amount, and the average selling price is equal to or greater than the consumption price in the target building 4, the energy operation scheduling unit 11 may determine a schedule for discharging the solar energy stored in the charging device 3 and selling the solar energy to the power grid 5.

The drawings and detailed description of the present disclosure described until now are merely exemplary of the present invention, which are only used for the purpose of explaining the present invention, and are not used to limit the meaning or the scope of the present invention described in the claims. Therefore, it will be understood by those of ordinary skill in the art that various modifications and equivalent other embodiments are possible therefrom. Accordingly, the technical scope of the present disclosure should be defined by the accompanying claims.

The embodiments described herein may be implemented with hardware components and software components and/or a combination of the hardware components and the software components. For example, the apparatus, method and components described in the embodiments may be implemented using one or more general-purpose or special purpose computers, such as a processor, a controller and an arithmetic logic unit (ALU), a digital signal processor, a microcomputer, a field programmable array (FPGA), a programmable logic unit (PLU), a microprocessor or any other device capable of executing and responding to instructions.

The processing device may run an operating system (OS) and one or more software applications that run on the OS. The processing device also may access, store, operate, process, and create data in response to execution of the software. For convenience of understanding, one processing device is described as being used, but those skilled in the art will appreciate that the processing device includes a plurality of processing elements and/or multiple types of processing elements.

For example, the processing device may include multiple processors or a single processor and a single controller. In addition, different processing configurations are possible, such a parallel processors. The software may include a computer program, a piece of code, an instruction, or some combination thereof, for independently or collectively instructing or configuring the processing device to operate as desired.

Software and/or data may be embodied in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the inventive concept, or they may be of the kind well-known and available to those having skill in the computer software arts.

Examples of computer readable recording media include magnetic media such as hard disks, floppy disks and magnetic tape, optical media such as CD-ROMs, DVDs, and hardware devices specifically configured to store and execute program instructions, such as ROM, RAM, flash memory, and the like. Examples of program instructions include not only machine code generated by a compiler, but also high-level language code that can be executed by a computer using an interpreter or the like. The hardware device described above may be configured to operate as one or more software modules to perform the operations of the present disclosure, and vice versa.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved. Therefore, other implementations, other embodiments, and equivalents to the claims are within the scope of the following claims.

The solar energy management method and system using deep reinforcement learning according to the present disclosure may perform scheduling such that solar energy is in any one state of being stored, discharged, consumed, or sold using a deep neural network using deep reinforcement learning.

In addition, the solar energy management method and system using deep reinforcement learning according to the present disclosure may increase the accuracy of the solar energy operation schedule by repeating the deep reinforcement learning in the deep neural network and reduce the solar energy management cost.

In addition, the solar energy management method and system using deep reinforcement learning according to the present disclosure may perform optimal energy transaction considering not only the solar energy consumption cost in a residential building but also the selling cost to a power company.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A solar energy management method using deep reinforcement learning, comprising:
receiving, by at least one processor, at least one or more pieces of energy information data for deep reinforcement learning of a deep neural network;
calculating, by the at least one processor, a reward value for controlling a solar energy management algorithm constituting the deep neural network using the at least one or more pieces of energy information data and performing the deep reinforcement learning; and determining, by the at least one processor, a schedule for storing, discharging, consuming or selling solar energy by inputting the at least one or more pieces of energy information data as input data of the solar energy management algorithm, wherein the receiving, by the at least one processor, the at least one or more pieces of energy information data includes:

receiving, by the at least one processor, an amount of generated solar energy from a photovoltaic system;

receiving, by the at least one processor, a load power amount measured in a target building;

receiving, by the at least one processor, an amount of stored solar energy of a charging device;

receiving, by the at least one processor, a selling price of the solar energy to a power grid;

receiving, by the at least one processor, an average selling price that is an average value of selling prices;

receiving, by the at least one processor, a consumption price of power consumed in the target building according to the load power amount; and receiving, by the at least one processor, a maximum load power amount measured in the target building, wherein the determining, by the at least one processor, the schedule for storing, discharging, consuming or selling solar energy includes determining, by the at least one processor, a largest output value of a Q-Value for an input value and an action value from among output values of the solar energy management algorithm as a target output value, wherein the calculating, by the at least one processor, the reward value for controlling the solar energy management algorithm constituting the deep neural network includes:

giving, by the at least one processor, a first reward value when the load power amount is greater than or equal to half of the maximum load power amount, the average selling price is less than the consumption price, and the solar energy is discharged because an action value of the target output value is negative;

giving, by the at least one processor, a first penalty value when the load power amount is greater than or equal to half of the maximum load power amount, the average selling price is less than the consumption price, and the solar energy is stored because the action value of the target output value is positive;

giving, by the at least one processor, a second reward value when the load power amount is greater than or equal to half of the maximum load power amount, the average selling price is greater than or equal to the consumption price, and the solar energy is discharged because an action value of the target output value is negative; and giving, by the at least one processor, a second penalty value when the load power amount is greater than or equal to half of the maximum load power amount, the average selling price is greater than or equal to the consumption price, and the solar energy is stored because the action value of the target output value is positive, wherein the solar energy management method further comprises:

transmitting, by the at least one processor, first control signals to the charging device and the target building to discharge the solar energy stored in the charging device and to allow the target building to consume the solar energy when the load power amount is greater than or equal to half of the maximum load power amount and the average selling price is less than the consumption price; and transmitting, by the at least one processor, second control signals to the charging device and the power grid to discharge the solar energy stored in the charging device and to sell the solar energy to the power grid when the load power amount is greater than or equal to half of the maximum load power amount and the average selling price is greater than or equal to the consumption price.

2. The solar energy management method of claim 1, wherein the determining, by the at least one processor, the schedule for storing, discharging, consuming or selling solar energy includes inputting, by the at least one processor, the amount of generated solar energy, the load power amount, the amount of stored solar energy, the selling price of the solar energy, the average selling price, the consumption price, and the maximum load power amount to the solar energy management algorithm as the input data.

3. The solar energy management method of claim 1, wherein the determining, by the at least one processor, the schedule for storing, discharging, consuming or selling solar energy includes, when an action value of the target output value is negative, the load power amount is greater than or equal to half of the maximum load power amount, and the average selling price is less than the consumption price, determining, by the at least one processor, a schedule for discharging the solar energy stored in the charging device and allowing the target building to consume the solar energy.

4. The solar energy management method of claim 1, wherein the determining, by the at least one processor, the schedule for storing, discharging, consuming or selling solar energy includes, when an action value of the target output value is negative, the load power amount is greater than or equal to half of the maximum load power amount, and the average selling price is greater than or equal to the consumption price, determining, by the at least one processor, a schedule for discharging the solar energy stored in the charging device and selling the solar energy to the power grid.

5. The solar energy management method of claim 1, wherein the determining, by the at least one processor, the schedule for storing, discharging, consuming or selling solar energy includes, when an action value of the target output value is positive and the amount of generated solar energy is greater than or equal to the load power amount, determining, by the at least one processor, a schedule for storing the solar energy in the charging device.

6. The solar energy management method of claim 1, wherein the calculating, by the at least one processor, the reward value for controlling the solar energy management algorithm constituting the deep neural network further includes:

giving, by the at least one processor, a third reward value when an action value of the target output value is negative and the amount of stored solar energy remaining in the charging device is within a preset reference capacity range as a result of the solar energy being discharged from the charging device; and giving, by the at least one processor, a third penalty value when an action value of the target output value is negative and the amount of stored solar energy remaining in the charging device is out of the preset reference capacity range as a result of the solar energy being discharged from the charging device.

7. The solar energy management method of claim 1, wherein the calculating, by the at least one processor, the reward value for controlling the solar energy management algorithm constituting the deep neural network further includes:
   giving, by the at least one processor, a third reward value when the selling price of the solar energy is equal to or greater than the average selling price, and the solar energy is discharged because an action value of the target output value is negative; and
   giving, by the at least one processor, a third penalty value when the selling price of the solar energy is equal to or greater than the average selling price, and the solar energy is stored because the action value of the target output value is positive.

8. The solar energy management method of claim 1, wherein the calculating, by the at least one processor, the reward value for controlling the solar energy management algorithm constituting the deep neural network further includes:
   giving, by the at least one processor, a third reward value when the selling price of the solar energy is less than the average selling price, and the solar energy is stored because an action value of the target output value is positive; and
   giving, by the at least one processor, a third penalty value when the selling price of the solar energy is less than the average selling price, and the solar energy is discharged because the action value of the target output value is negative.

9. The solar energy management method of claim 1, wherein the calculating, by the at least one processor, the reward value for controlling the solar energy management algorithm constituting the deep neural network further includes:
   giving, by the at least one processor, a third reward value when an action value of the target output value is positive and the amount of stored solar energy stored in the charging device is within a preset reference capacity range as a result of the solar energy being stored in the charging device; and
   giving, by the at least one processor, a third penalty value when the action value of the target output value is positive and the amount of stored solar energy stored in the charging device is out of the preset reference capacity range as a result of the solar energy being stored in the charging device.

10. The solar energy management method of claim 1, wherein the calculating, by the at least one processor, the reward value for controlling the solar energy management algorithm constituting the deep neural network further includes:
    giving, by the at least one processor, a third reward value when the load power amount is less than the amount of generated solar energy and the solar energy is stored in the charging device because an action value of the target output value is positive; and
    giving, by the at least one processor, a third penalty value when the load power amount is greater than or equal to the amount of generated solar energy and the solar energy is stored in the charging device because the action value of the target output value is positive.

11. A solar energy management system using deep reinforcement learning, comprising:
    at least one processor,
    wherein the at least one processor includes:
    an input unit configured to receive at least one piece of energy information data for deep reinforcement learning of a deep neural network;
    an energy operation scheduling unit configured to input the at least one piece of energy information data as input data of a solar energy management algorithm constituting the deep neural network to perform the deep reinforcement learning and determine a schedule for storing, discharging, consuming, or selling solar energy; and
    a control unit configured to calculate a reward value for controlling the solar energy management algorithm and perform the deep reinforcement learning by inputting the at least one piece of energy information data as the input data of the solar energy management algorithm,
    wherein the input unit is configured to:
    receive an amount of generated solar energy from a photovoltaic system;
    receive a load power amount measured in a target building;
    receive an amount of stored solar energy of a charging device;
    receive a selling price of the solar energy to a power grid;
    receive an average selling price that is an average value of selling prices;
    receive a consumption price of power consumed in the target building according to the load power amount; and
    receive a maximum load power amount measured in the target building,
    wherein the energy operation scheduling unit is configured to determine a largest output value of a Q-Value for an input value and an action value from among output values of the solar energy management algorithm as a target output value,
    wherein the control unit is configured to:
    give a first reward value when the load power amount is greater than or equal to half of the maximum load power amount, the average selling price is less than the consumption price, and the solar energy is discharged because an action value of the target output value is negative;
    give a first penalty value when the load power amount is greater than or equal to half of the maximum load power amount, the average selling price is less than the consumption price, and the solar energy is stored because the action value of the target output value is positive;
    give a second reward value when the load power amount is greater than or equal to half of the maximum load power amount, the average selling price is greater than or equal to the consumption price, and the solar energy is discharged because an action value of the target output value is negative; and
    give a second penalty value when the load power amount is greater than or equal to half of the maximum load power amount, the average selling price is greater than or equal to the consumption price, and the solar energy is stored because the action value of the target output value is positive,
    wherein the control unit is further configured to:

transmit first control signals to the charging device and the target building to discharge the solar energy stored in the charging device and to allow the target building to consume the solar energy when the load power amount is greater than or equal to half of the maximum load power amount and the average selling price is less than the consumption price; and transmit second control signals to the charging device and the power grid to discharge the solar energy stored in the charging device and to sell the solar energy to the power grid when the load power amount is greater than or equal to half of the maximum load power amount and the average selling price is greater than or equal to the consumption price.

12. A computer-readable non-transitory recording medium recording a program for executing the solar energy management method using deep reinforcement learning of claim 1.

* * * * *